United States Patent [19]

Lillquist et al.

[11] Patent Number: 4,711,986

[45] Date of Patent: Dec. 8, 1987

[54] METHOD AND APPARATUS FOR MEASURING WELD PENETRATION IN AN ARC WELDING PROCESS

[75] Inventors: Robert D. Lillquist, Schenectady; Allen W. Case, Jr., Amsterdam, both of N.Y.

[73] Assignee: General Electric Company, Schenectady, N.Y.

[21] Appl. No.: 934,522

[22] Filed: Nov. 24, 1986

[51] Int. Cl.$^4$ .............................................. B23K 9/10
[52] U.S. Cl. .................................. 219/130.01; 219/75; 219/130.21
[58] Field of Search ...................... 219/130.01, 124.34, 219/130.21, 74, 75

[56] References Cited

U.S. PATENT DOCUMENTS

| | | | |
|---|---|---|---|
| 2,994,060 | 7/1961 | Ross | 340/3 |
| 3,864,542 | 2/1975 | Fletcher et al. | 219/137 |
| 3,882,718 | 5/1975 | Kriebel | 73/80 |
| 4,083,255 | 4/1978 | McKechnie | 73/655 |
| 4,206,511 | 6/1980 | Ries et al. | 367/96 |
| 4,326,155 | 4/1982 | Griebeler | 318/576 |
| 4,488,032 | 12/1984 | Case, Jr. et al. | 219/124 |
| 4,532,405 | 7/1985 | Corby, Jr. et al. | 219/124 |
| 4,578,561 | 3/1986 | Corby, Jr. et al. | 219/124 |
| 4,595,820 | 6/1986 | Richardson | 219/137 |

OTHER PUBLICATIONS

Masubuchi, K., et al., "Improvement of Reliability of Welding by In-Process Sensing and Control", Massachusetts Inst. of Technology, American Society of Metals, pp. 667-695, 1982.

Zacksenhouse et al., "Weld Pool Impedance Identification for Size Measurement and Control", Massachusetts Inst. of Technology, Proceedings of the Winter Annuals Meeting of the American Society of Mechanical Engineers, pp. 77-88, Nov., 1982.

Primary Examiner—Clifford C. Shaw
Attorney, Agent, or Firm—Donald R. Campbell; James C. Davis, Jr.; Paul R. Webb, II

[57] ABSTRACT

The penetration in an arc welding process is measured in real time by monitoring the natural frequency of oscillation of the weld pool. Spatial oscillations are induced in the weld pool by modulating either the shielding gas or the welding current at a plurality of different frequencies, and the light reflected from the pool at a non-specular angle is sensed and processed to determine the natural frequency of oscillation. Both pulse and swept frequency modulations are employed for excitation of the weld pool.

17 Claims, 7 Drawing Figures

METHOD AND APPARATUS FOR MEASURING WELD PENETRATION IN AN ARC WELDING PROCESS

BACKGROUND OF THE INVENTION

This invention relates generally to arc welding processes, and more particularly to a method and an apparatus for monitoring an arc welding process in real-time to measure weld penetration.

In order to obtain adequate strength and integrity in a welded joint, it is necessary that proper weld penetration be achieved so that upon resolidification of the molten metal of the weld pool good adhesion between the metal parts forming the joint is achieved. Too little penetration results in incomplete adhesion between the metal parts throughout the thickness of the joint, and too much penetration, or burn-through, may produce undue weakening of the base metal of the parts surrounding the weld joint.

The integrity and quality of an arc welded joint is determined largely by the weld pool geometry during the welding process, along with the metallurgical properties of the weld metal and the heat effect on the base metal. Because variations in local metal thickness and composition, joint width, heat sinking and grounding geometry may cause variations in bead width, penetration, and the resulting seam geometry, there exists a need, particularly in automatic welding processes, for non-contacting sensors which are capable of reliably measuring weld penetration in real-time from the torch side of the weld. Various techniques have been proposed for accomplishing this. However, these techniques suffer from one or more disadvantages, or otherwise have proved to be unsatisfactory.

One such technique involves the measurement of the planar surface geometric characteristics of weld pools during the arc welding process by optically sensing the weld pool, as with a television camera, to measure the pool width and area. However, with certain materials, notably nickel-based superalloys, small variations in minor constituent elements can cause wide variations in weld puddle (pool) depth, i.e., penetration, even though the torch-side appearance of the puddle remains unchanged. Penetration may, of course, be detected if there is optical access to the underside of the workpiece, and this technique has been employed in some situations, but it is usually impractical in most industrial welding situations.

It is known that it is possible to determine the cross-sectional profile of a weld puddle if the puddle surface geometry, primarily its width, and natural oscillation frequency of the molten metal are known. It is further known that the natural oscillation frequency of the puddle drops when full penetration of the workpiece is achieved. Accordingly, another approach which has been used is to excite the weld pool to oscillation, as by applying a current pulse to the electrode of the arc welding torch, and by monitoring the arc voltage and analyzing the voltage variations to derive the oscillation frequencies of the weld pool. Arc voltage, which is influenced by gas composition, electrode wear, puddle surface impurities, and a host of other effects besides arc length is not an ideal parameter for sensing puddle oscillations. Moreover, in moving welds, the electrode is displaced from the geometric centroid of the weld pool where puddle oscillation amplitude would be maximized at full penetration, thereby rendering it harder to detect the oscillations by monitoring the arc voltage.

There exists a need for a method and an apparatus for reliably and easily measuring weld penetration in an arc welding process which avoid the foregoing and other disadvantages, and it is to this end that the present invention is directed.

SUMMARY OF THE INVENTION

The invention provides a method and an apparatus for monitoring an arc welding process which achieves the foregoing desired objectives and which avoids the above-noted and other disadvantages of known methods and apparatus. The invention operates in real-time and from the torch or face side of a workpiece during a moving torch arc welding process to provide reliable and accurate measurements of the weld puddle natural oscillation frequencies. The invention enables the detection, in real-time, of the transition from partial to full penetration of the weld, and, when used in combination with means capable of measuring the torch-side weld pool geometrical parameters such as surface width and area, can be used to determine the average depth of the weld pool.

Briefly stated, the invention optically senses the light reflected at a non-specular angle from a weld pool during an arc welding process and provides a signal which is representative of the amount of light sensed. The weld pool is excited at a plurality of different frequencies which induce spatial oscillations in the weld pool, and the natural frequency of oscillation of the weld pool is determined from the changes in the amount of reflected light which is sensed.

In accordance with more specific aspects, the invention operates with either the ambient light produced by the arc formed between the electrode of the welding torch and the workpiece, or it may operate with a separate monochromatic light source, e.g., a laser, which floods the weld pool with diffuse uniform light of a predetermined wavelength. In this latter case, a monochromatic light filter matched to the illumination source wavelength may be employed for restricting the light reaching the light sensor to the predetermined wavelength of the illumination source. The filter prevents most of the background arc light from reaching the light sensor. The light sensor may comprise a simple photoelectric detector, such as a silicon photodiode or the like, or may comprise a two-dimensional sensor such as a camera which enables both the amount of light reflected from the weld pool as well as the surface geometrical characteristics of the weld pool to be measured. In a non-resonant condition, the surface profile of the weld pool is sufficiently flat so that the amount of light reflected in the non-specular direction at which the weld pool is viewed is at a minimum. When the weld pool is excited, surface waves on the pool reflect more light back to the light sensor causing an increase in its output. At resonance, the amount of light reflected in the non-specular direction is increased substantially and the light sensor produces its maximum output.

There are several ways to excite the weld pool in order to induce spatial oscillations in the pool. In a preferred embodiment of the invention, the weld pool is excited by modulating the welding shield gas which surrounds the arc. This may be accomplished by supplying the shield gas to the torch through a gas flow modulation chamber which encloses an electrically controlled device, such as a loudspeaker or the like, which is capable of modulating the pressure of the gas flowing through the chamber. The shield gas may also be modulated by varying the amount of shield gas provided to the torch from a secondary gas source in parallel with the normal gas supply, as by using an electrically controlled valve or the like to control the gas flow from the secondary source. The weld pool may also be excited by modulating the welding current supplied to the welding electrode.

The weld pool may be excited to oscillation by driving whatever form of modulator is employed with a voltage step or pulse which induces simultaneous oscillation of the weld pool at a plurality of different frequencies, or by a time-varying or swept frequency, i.e., a chirp. When the weld pool is excited using a pulse, the resonant or natural frequency of oscillation may be determined by performing a real-time spectral analysis of the output from the light sensor. When a swept frequency or chirp is employed, the resonant frequency of the pool may be determined by detecting the excitation frequency at which the maximum output from the light sensor occurs.

DESCRIPTION OF THE PREFERRED EMBODIMENTS

Figure 1:
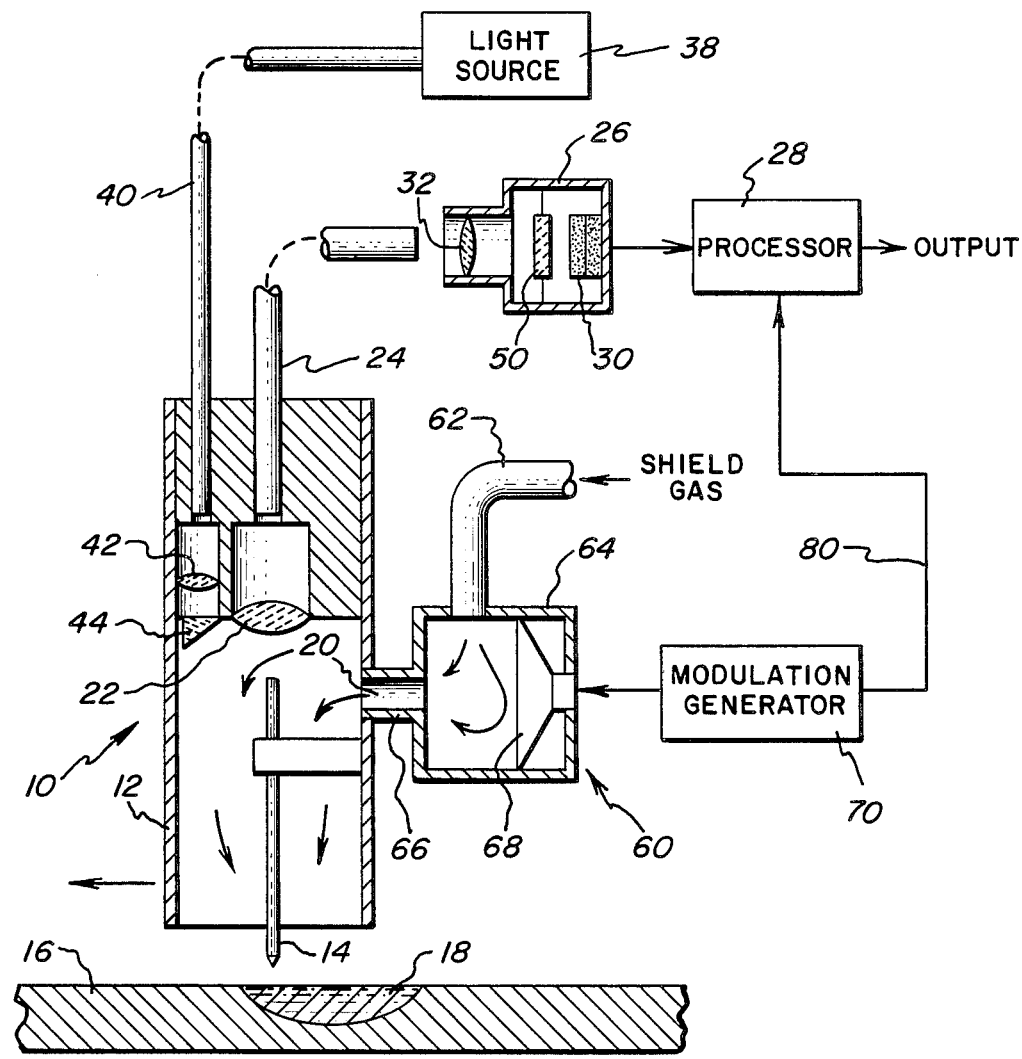
FIG. 1 illustrates diagrammatically a first embodiment of the invention.

FIG. 1 illustrates a first embodiment of the invention employed with a tungsten inert gas arc welding torch 10. The torch, which is illustrated diagrammatically, may comprise a housing 12 having centrally supported therein an electrode 14 which protudes from an end of the housing adjacent to a workpiece 16. When an electric arc is struck between the electrode and the workpiece, the base metal of the workpiece melts to form a weld pool or puddle 18 (both terms "pool" and "puddle" being used herein interchangeably) beneath the welding torch. As the torch is moved along the workpiece, as to the left in FIG. 1, the molten metal behind the torch cools and resolidifies. By abutting two workpieces together and moving the torch along the seam between the workpieces, the abutting edges of the workpieces are melted by the torch and the workpieces are joined together when the molten metal resolidifies. If desired, fill metal wire may be supplied to the electric arc and melted along with the base metal of the workpieces. An inert shield gas, such as Argon for example, is supplied under pressure to the interior of the torch housing via an inlet opening 20. The inert gas flows out of the end of the torch, as indicated by the arrows, and it envelopes and shields the arc formed between the electrode and the workpiece.

Proper weld penetration is necessary to afford good adhesion between workpiece parts and insure adequate strength and integrity of welded joints. If the weld penetration, i.e., the depth of the molten weld pool in a workpiece, is too shallow, incomplete adhesion can occur and a weak joint may result. If the weld penetration is too great, burn-through can occur and weakening of the base metal may result. Weld penetration is influenced by a number of different factors, including the metallurgical properties of the weld metal and the heat effect on the base metal. Variations in local metal thickness and composition, joint width, heat sinking and grounding geometry may lead to unacceptable variations in weld bead width, penetration and resulting seam geometry. Although weld penetration is related to the planar surface geometric characteristics of the weld pool, knowledge of such characteristics alone is insufficient to determine weld penetration. With certain materials, most notably nickel-based superalloys, small variations in minor constituent elements of the materials may cause wide variations in pool depth, i.e. penetration, even though the torch-side appearance of the weld pool remains unchanged.

As will be explained more fully shortly, the invention measures weld penetration by monitoring from the torch side of the weld and in real-time the natural oscillation frequency of the weld pool. The natural frequency of oscillation abruptly decreases when full penetration occurs, and this may be employed for detecting the transition from partial to full penetration and for controlling the welding process.

Typically, the natural frequency of oscillation of weld pools is in the range of frequencies of 300 Hz or less, and at full penetration the natural frequency of oscillation may decrease by one-half. The invention measures weld penetration by optically monitoring the light reflected from the weld pool to determine its natural frequency of oscillation. Referring to FIG. 1, this may be accomplished by means of a puddle view optical system comprising a lens 22 mounted within the torch housing 12 so as to view the bulk of the weld pool at a non-specular reflection angle. The light received by lens 22 may be focused onto the end of a fiber optics cable 24 which enters the torch housing. The fiber optics cable transmits the received light to a light sensor 26 which measures the amount, e.g., the intensity, of the light received and provides a corresponding electrical signal to a processor 28. The processor analyzes the electrical signal from the light sensor to determine the natural frequency of oscillation of the weld pool, and may output a formatted signal identifying this natural frequency. The specific format of the output signal may be tailored to the particular device to which it is supplied.

Fiber optics cable 24 may comprise either a non-image transmitting fiber optics cable or an image transmitting optical fiber bundle. Although FIG. 1 illustrates lens 22 and fiber optic cable 24 physically integrated within the torch housing, these devices may also be enclosed in a separate housing which is attached to the torch. Arc welding torches having integral optical systems for viewing weld pools which may be employed by the invention are shown, for example, in commonly assigned U.S. Pat. Nos. 4,532,405 and 4,578,561 to Corby, Jr. et al, and in U.S. Pat. No. 4,488,032 to Case, Jr. et al. Light sensor 26, which measures the light transmitted through the fiber optics cable, may simply comprise a light detector 30, such as a silicon photodiode, enclosed within a housing having a lens 32 arranged to image the light from the fiber optics cable onto the light detector. With this arrangement, the light detector integrates the received light and provides an output signal having a magnitude corresponding to the quantity of received light. Alternatively, light sensor 26 may comprise a two-dimensional device, such as a video camera or the like, which forms an image of the weld pool and provides a corresponding output signal. Using a two-dimensional detector, processor 28 may be arranged to measure not only the natural frequency of oscillation of the weld pool, but also its surface geometrical characteristics, and would enable tracking of a seam between workpieces being welded.

Since the puddle imaging optics views the weld pool at a non-specular reflection angle, when the weld pool, which has a specular surface, is in a non-perturbed or non-resonant condition, its surface is substantially flat and most of the light reflected from the weld pool surface is away from the puddle view optics. Thus, the output signal from the light detector will be correspondingly low. Normally, the workpiece will have a relatively rough surface and will diffusely reflect light. Accordingly, if the field of view of the puddle imaging optics is sufficiently large to encompass both the weld pool and a portion of the workpiece surrounding the weld pool, more light will be reflected from the workpiece to the puddle view optics than from the weld pool, and if a two-dimensional light sensor is employed, the weld pool will appear dark in relation to the area which surrounds it. When the weld pool is perturbed or excited, the molten material of the weld pool will undergo spatial oscillations and surface waves will temporally reflect light to the puddle imaging optics in a time-varying pattern, causing the output signal from the light sensor to vary in time in a similar manner. When the weld pool is excited at a natural or resonant frequency of oscillation, these surface waves on the weld pool will increase and cause the amount of light reflected to the view optics to increase, producing a corresponding increase in the output signal from the light detector. The invention utilizes this fact to determine the natural frequency of oscillation of the weld pool, in a manner in which will be described shortly.

The ambient light produced by the electric arc between electrode 14 and workpiece 16 is sufficient to enable the resonant frequency of the weld pool to be determined. However, a better signal-to-noise ratio may be obtained in the output signal from the light sensor by illuminating the weld pool from an intense source of monochromatic light, such as from a laser, and by restricting the light reaching the detector to a narrow spectral band about the wavelength of the monochromatic light. This may be accomplished, as illustrated in FIG. 1, by transmitting light from a monochromatic light source 38, such as a laser, via a fiber optics cable 40 to a flood light projector optical system which expands the light beam and illuminates the weld pool and its surrounding area with monochromatic light. Laser 38 may have an operating wavelength of 6328 Å, for example, the flood light projector system may be enclosed within the torch housing, and may comprise a first lens 42 which receives and expands the light from the fiber optics cable 40 and transmits it to a second prism-shaped lens 44 which projects the light beam to provide diffuse uniform lighting of the weld pool. The reflected monochromatic light received by lens 22 is transmitted by fiber optic cable 24, as previously described, to light sensor 26. In order to prevent background arc light from reaching light detector 30, light sensor may include a spectral band filter 50 matched to the wavelength of the monochromatic light and disposed between lens 32 and light detector 30. Spectral filter 50 passes the monochromatic light to detector 30, but prevents most of the background arc light received by lens 22 from reaching the detector. This reduces background noise in the signal provided by light detector 30 to processor 28, and improves the signal-to-noise ratio. While FIG. 1 illustrates the flood light projection optical system comprising lenses 42 and 44 physically integrated into the torch housing, as with the puddle view optics, this optical system may be enclosed in a separate housing attached to the torch. The previously referenced Corby, Jr. et al patents disclose arc welding torches employing monochromatic light illumination and detection systems which may be employed with the present invention.

Figure 2:
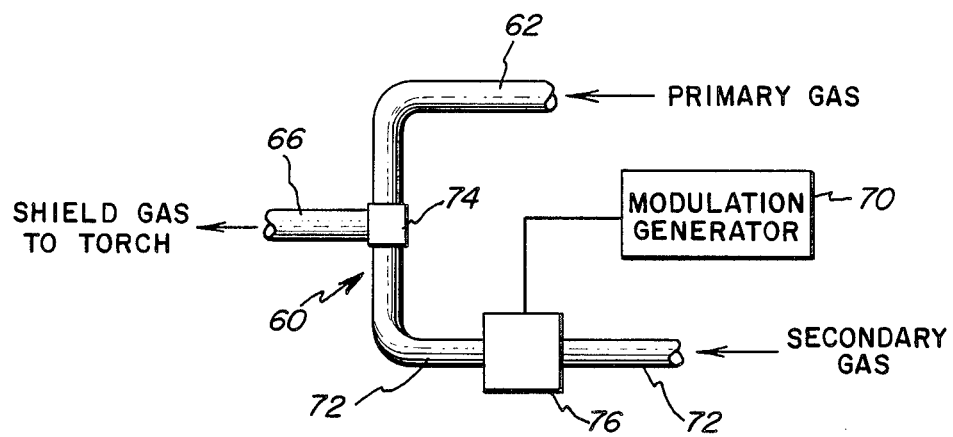
FIG. 2 illustrates an alternative shield gas modulation arrangement in accordance with the invention.

Weld pool 18 may be excited to resonance in several different ways. A preferred manner of accomplishing this is by modulating the shield gas supplied to the welding torch. FIG. 1 illustrates a first embodiment of a driver/exciter subsystem 60 in accordance with the invention for modulating the shield gas flow rate. As shown, the shield gas flowing to the torch through a line 62 is first caused to pass through a driver chamber 64 disposed upstream of the gas inlet 20 in the torch housing. The shield gas enters the chamber via line 62, and exits the chamber via another line 66 connected to inlet opening 20 in the torch hosing. Disposed within the driver chamber is a gas flow modulator 68 which is driven by a modulation generator 70. Gas flow modulator 68 may be any device capable of modulating the flow rate of the gas through the chamber in response to the signal from the modulation generator. Modulator 68 may comprise, for example, an electromagnetic device such as a loudspeaker, a piezoelectric driver, or other sound transducer capable of converting an electrical signal from the modulation generator into an acoustic signal. The acoustic signal varies the gas pressure within driver chamber 64 and, in turn, varies the flow rate of the gas passing through the chamber which is supplied to the torch. The variations in the gas flow cause the force applied to the weld pool to vary, thereby inducing spatial oscillations or waves on the surface of the weld pool. The modulator may be arranged to modulate the gas flow at a predetermined percentage of the average gas flow rate, e.g., 10%. The modulation should not be so great as to turn off the gas flow completely, or to vary the flow rate too much, since this could possibly extinguish the arc. The gas modulation need only be large enough so that the spatial oscillations induced in the weld pool reflect sufficient light to the puddle imaging optics to enable the natural frequency of oscillation of the weld pool to be detected reliably. FIG. 2 illustrates an alternative embodiment of a driver/exciter subsystem 60 for modulating the gas flow to the torch. As shown in FIG. 2, the primary shield gas flowing through line 62 may be combined with the secondary gas flow in a line 72 by connecting lines 62 and 72 together with a T-connector 74, so that the combined gas flow enters line 66 which supplies shield gas to the torch. The secondary gas flow in line 72 may be modulated by an electrically operated device 76, such as a valve, controlled by modulation generator 70. Valve 76 causes the secondary gas flow in line 72 to vary in accordance with the electrical signal from the modulation generator, and thus causes the combined gas flow in line 66 to vary in a similar manner.

In order to induce spatial oscillations in the weld pool at its natural frequency of oscillation, it is necessary to excite the weld pool at this frequency, which is typically in the range of 300 Hz or less, as previously noted. This requires that the exciter/driver subsystem and modulation generator modulate the gas flow at this frequency. However, the natural frequency of oscillation is the quantity which is being measured and, therefore, is unknown, and, in any event, the frequency varies with penetration and this variation must be monitored. Moreover, weld pools oscillate not only at their fundamental resonant frequency, but also at harmonics of this frequency, and if the weld pools are non-circular (which is normally the case with moving weld torches since the weld pool tends to become elongated), the weld pools may oscillate at a number of different natural frequencies. Accordingly, it is necessary that exciter/driver subsystem 60 and modulation generator 70 excite the weld pool at a plurality of different frequencies and in such a manner as to enable changes in the natural oscillation frequency to be measured. There are several ways of accomplishing this, which will be described below, and the way chosen will determine the manner in which the signal from light sensor 26 is processed.

Figure 3:
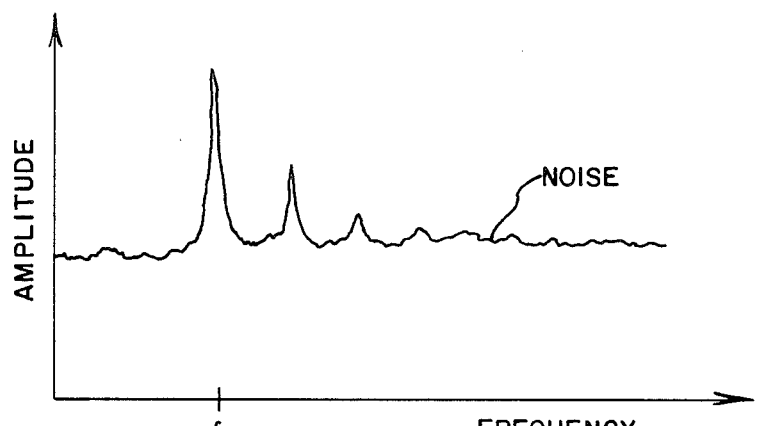
FIG. 3 illustrates a typical frequency spectrum of the light reflected from a weld pool.

One way of determining and monitoring changes in the natural frequency of oscillation of a weld pool is to excite the weld pool at a plurality of different frequencies simultaneously. This may be accomplished by constructing modulation generator 70 to be a pulse generator and by modulating the gas flow with impulses. Since the frequency spectrum of an impulse is broad, this is equivalent to exciting the weld pool at a plurality of different frequencies simultaneously. Accordingly, the resulting time-varying signal from light sensor 26 will contain the weld pool natural frequency as well as harmonics of this frequency. These frequencies may be determined by performing a Fourier spectral analysis of this time-varying signal, and processor 28 may comprise a conventional spectrum analyzer for performing this analysis. FIG. 3 shows a typical frequency spectrum of the time-varying signal from the light sensor in response to impulse excitation of the weld pool. The amplitude peaks rising from the background noise correspond to the frequencies of oscillation of the weld pool, the lowest frequency peak, $f_0$, being the natural fundamental frequency of oscillation and the remaining peaks being harmonics of this frequency. Processor 28 determines the frequency of this peak in real-time, and outputs an appropriate signal indicating this frequency.

Modulation generator 70 may be arranged to output a single pulse upon command, or, preferably, to output automatically a train of pulses to modulator 68 with the time spacing between the pulses selected so as to be consistent with the time required to process the time-varying signal from the light sensor to afford continuous monitoring of the natural frequency. The modulation generator may also output a sync signal via a line 80 to processor 28 each time a pulse is produced to enable the processor to be synchronized with the modulation.

Figure 4A:
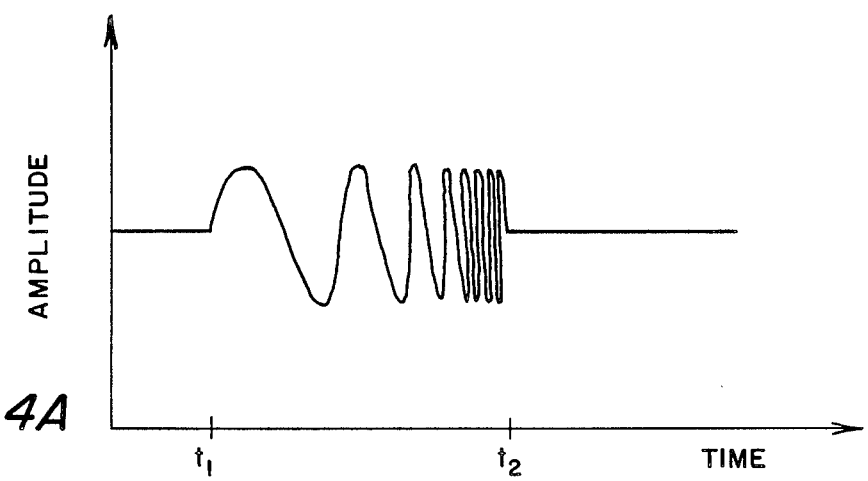
FIGS. 4 A-C are, respectively, an amplitude-time plot illustrating a swept frequency modulation; a frequency-time plot illustrating the change in frequency with time of the swept frequency; and a typical amplitude-time response of a light detector.
Figure 4B:
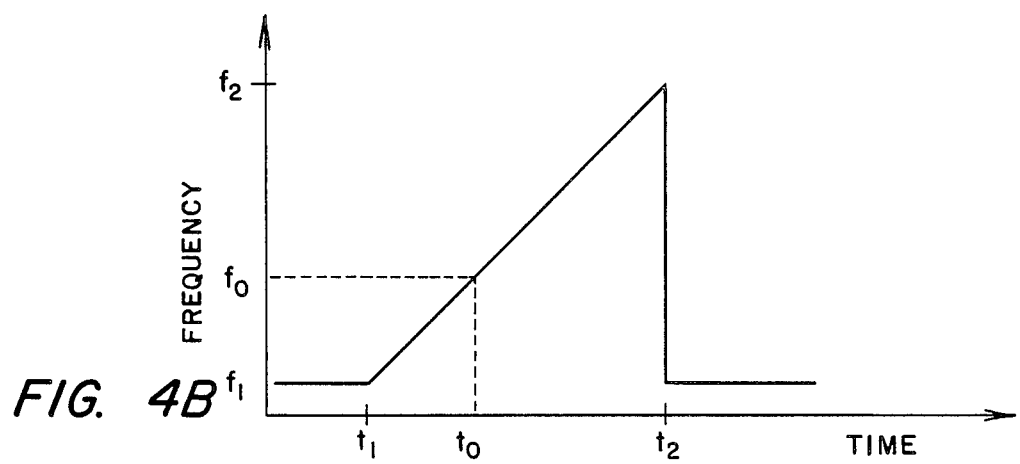
Figure 4C:
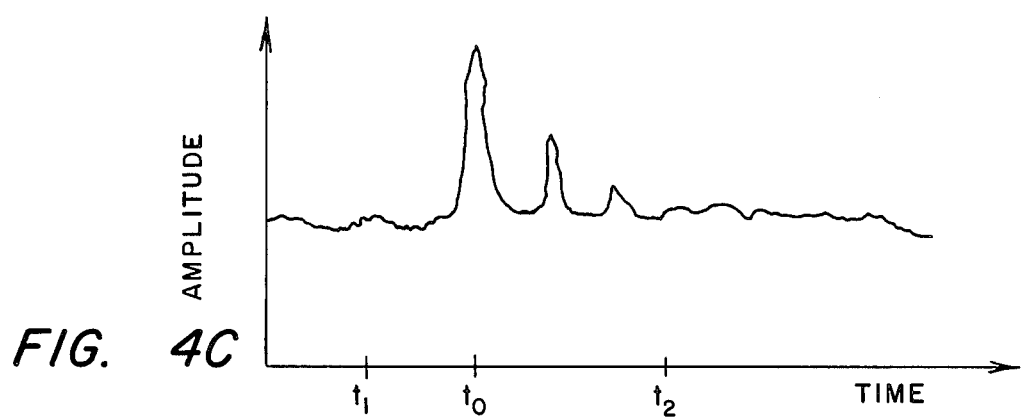

Another way of exciting the weld pool at a plurality of different frequencies is to modulate the gas flow with a constant amplitude swept frequency or "chirp" signal, such as illustrated in FIG. 4A. In this case, modulation generator 70 may comprise a variable frequency oscillator which produces a constant amplitude signal which is swept continuously upwardly or downwardly through a predetermined frequency band over a time interval $t_2 - t_1$. The frequency band associated with weld pool oscillations is nominally 0–300 Hz, and the variable frequency from the oscillator may be swept between a frequency $f_1$ and $f_2$ within this frequency band. The swept frequency modulation applied to the gas flow will cause the weld pool to oscillate briefly when the swept frequency matches the fundamental weld pool frequency (or frequencies if the pool is non-circular) or a harmonic of these frequencies, and the time-varying signal from light sensor 26 will vary in amplitude with time in a manner such as illustrated in FIG. 4C. As shown, a resonant condition of the weld pool may be sensed by detecting a substantial increase in the output from the light sensor, and correlating the time at which this occurs with the frequency from the modulation generator. As illustrated in FIGS. 4B and C, if the frequency from the modulation generator is swept linearly upwardly between frequencies $f_1$ and $f_2$, the fundamental frequency of oscillation of the weld pool, which is the lowest frequency or the first peak in the time interval $t_1$ to $t_2$ which is detected, the frequency of oscillation may be readily determined by measuring the time interval $t_0 - t_1$ and interpolating between the frequencies $f_1$ and $f_2$. Accordingly, processor 28 may simply comprise a timer which measures this time interval and outputs a signal corresponding to the frequency, $f_0$. The sync signal on line 80 from the modulation generator would, of course, reset the timer at the start of each swept frequency cycle. The modulation generator may be formed to output a frequency sweep signal either at regular intervals or whenever a frequency measurement is desired. Using a swept frequency for exciting the weld pool, as just described, has the advantage of simplifying somewhat the analysis of the time-varying signal from the light sensor over the spectral analysis required by modulating the gas flow with pulses.

Figure 5:
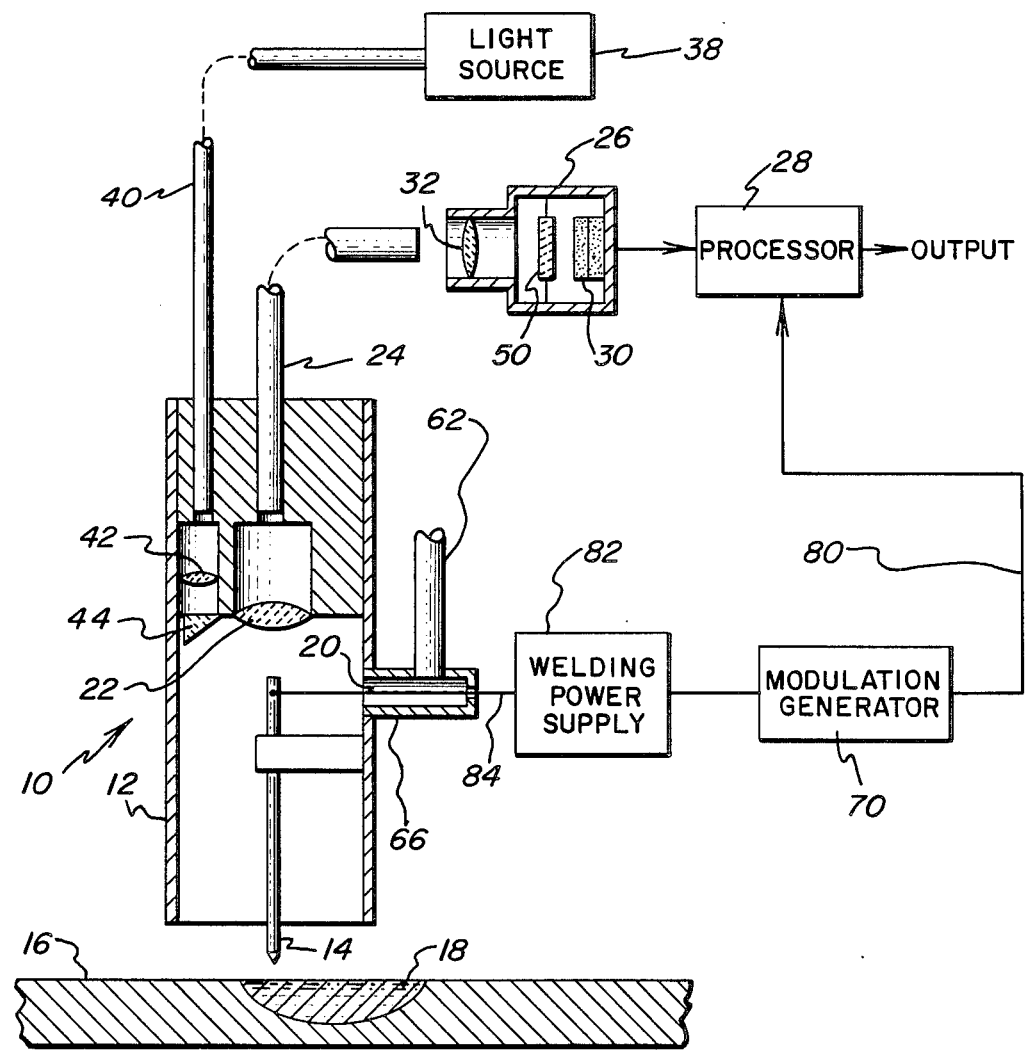
FIG. 5 illustrates a second embodiment of the invention.

FIG. 5 illustrates another embodiment of the invention which employs a different method for exciting the weld pool. The embodiment illustrated in FIG. 5 is similar to that of FIG. 1, and like elements are designated by the same reference numerals, except that in the embodiment of FIG. 5 the weld pool is excited by modulating the welding current supplied to electrode 14 from a welding power supply 82 via a line 84. As shown diagrammatically in the figure, line 84 may pass through shield gas line 66 and gas inlet 20 in the torch housing and be connected to the electrode. The signal from modulation generator 70 may be connected to the welding power supply 82, as shown, for modulating the welding current to the electrode. The modulation generator may be either a pulse or swept frequency generator, as previously described, and the modulation signal from the generator causes the welding current to vary with respect to a preset value in accordance with the modulation. The variations in the current cause the weld pool to oscillate at the frequency at which the current is modulated. The natural frequency of oscillation of the weld pool may be detected and processed in the same manner as that previously described in connection with the modulation of the shield gas.

By continuously monitoring the natural frequency of oscillation of the weld pool as described, the transition from the partial to full penetration may be readily detected. Typically, the natural frequency drops by about one-half when full penetration occurs, and this frequency information may be supplied to a controller (not shown) for controlling the welding process so as to maintain proper penetration. Furthermore, by combining the frequency information with the surface geometrical parameters of the weld pool, such as its width and area, the degree of penetration may be determined for less than full penetration. The surface geometrical parameters may be measured using a two-dimensional optical sensor, as previously indicated, such as is disclosed in the above-referenced patents.

Although preferred embodiments of the invention have been shown and described, it will be apparent to those skilled in the art that changes can be made in these embodiments without departing from the principles and spirit of the invention, the scope of which is defined in the appended claims.

We claim:

1. An apparatus for continuously monitoring an arc welding process in which an electrical current forms an arc between an electrode of a moving welding torch and a workpiece to create a weld pool in the workpiece, the apparatus comprising optical means on said welding torch for sensing light reflected from the pool at a non-specular angle and for providing a signal representative of the light sensed; means for exciting the pool at a plurality of different frequencies so as to induce spatial oscillations in the pool; and means responsive to the signal from the sensing means for determining the natural frequency of oscillation of the pool and detecting the transition from partial to full penetration of said weld pool.

2. The apparatus of claim 1, wherein the exciting means comprises means for applying a variable force to the pool, and frequency generator means for driving the force applying means at said plurality of different frequencies.

3. The apparatus of claim 2, wherein said generator means comprises a pulse generator, and the determining means comprises means for performing a spectral analysis of the signal from the sensing means to detect a frequency at which said signal has a peak magnitude.

4. The apparatus of claim 2, wherein said generator means comprises a sweep frequency generator, and the determining means comprises means for detecting a frequency of the generator at which the signal from the sensing means has a peak magnitude.

5. The apparatus of claim 4, wherein said determining means comprises means for measuring a time interval between the beginning of a sweep frequency cycle from said generator and the time of occurrence of said peak magnitude, and means for correlating said time interval to the frequency of the generator at said time of occurrence.

6. The apparatus of claim 1, further comprising means for flooding the pool with monochromatic light having a predetermined wavelength, and wherein said sensing means comprises means for sensing reflected light in a narrow band of wavelengths about said predetermined wavelength.

7. The apparatus of claim 6, wherein said sensing means comprises a photoelectric detector and a narrow band spectral filter, and means for transmitting said reflected light from the pool to the photoelectric detector through said filter.

8. An apparatus for monitoring an arc welding process in which an electrical current forms an arc between an electrode of a welding torch and a workpiece to create a weld pool in the workpiece, the apparatus comprising optical means for sensing light reflected from the pool at a non-specular angle and for providing a signal representative of the light sensed; means for exciting the pool at a plurality of different frequencies so as to induce spatial oscillations in the pool; and means responsive to the signal from the sensing means for determining the natural frequency of oscillation of the pool; wherein the exciting means comprises means for applying a variable force to the pool, and frequency generator means for driving the force applying means at said plurality of different frequencies; and wherein a shielding gas flows to the welding torch for shielding the arc, and said force applying means comprises means for modulating the gas flow.

9. The apparatus of claim 8, wherein the modulating means comprises a modulation chamber through which the shielding gas passes, and means disposed within the chamber for varying the gas pressure within the chamber.

10. The apparatus of claim 9, wherein said gas pressure varying means comprises an electrically controlled acoustic transducer.

11. The apparatus of claim 10, wherein said acoustic transducer comprises a loudspeaker.

12. The apparatus of claim 8, wherein said force applying means comprises means for supplying another shielding gas flow to the torch, and means responsive to the frequency generator means for modulating said other gas flow.

13. The apparatus of claim 12, wherein said means for modulating said other gas flow comprises an electrically controlled valve for varying said other gas flow.

14. A method for monitoring an arc welding process in which an electrical current forms an arc between an electrode of a welding torch and a workpiece to create a weld pool in the workpiece, the method comprising sensing light reflected from the pool at a non-specular angle; providing a signal representative of the light sensed; exciting the pool at a plurality of different frequencies so as to induce spatial oscillations in the pool; and analyzing the signal to determine the natural frequency of oscillation of the pool; wherein said exciting comprises modulating the flow rate of a shielding gas which flows to the torch.

15. The method of claim 14, wherein said modulating comprises pulsing the gas flow rate, and said analyzing comprises performing a spectral analysis of said signal.

16. The method of claim 14, wherein said modulating comprises varying the flow rate of the gas at a swept frequency, and said analyzing comprises measuring the time of occurrence of a peak of said signal and correlating said time to a frequency of said modulating.

17. The method of claim 14, further comprising flooding the pool with monochromatic light having a predetermined wavelength, and wherein said sensing comprises sensing reflected light in a narrow band of wavelengths about said predetermined wavelength.

* * * * *